(12) United States Patent
Wachter et al.

(10) Patent No.: US 8,956,491 B2
(45) Date of Patent: Feb. 17, 2015

(54) METHOD FOR MANUFACTURING A PARTIALLY COATED CARRIER STRUCTURE

(75) Inventors: Hans-Jürgen Wachter, Ober-Roden (DE); Johannes Müller, Jossgrund (DE); Josef Roth, Bessenbach (DE)

(73) Assignee: Heraeus Deutschland GmbH & Co. KG, Hanau (DE)

( * ) Notice: Subject to any disclaimer, the term of this patent is extended or adjusted under 35 U.S.C. 154(b) by 128 days.

(21) Appl. No.: 13/439,993

(22) Filed: Apr. 5, 2012

(65) Prior Publication Data

US 2012/0270019 A1 Oct. 25, 2012

(30) Foreign Application Priority Data

Apr. 20, 2011 (DE) .......................... 10 2011 018 342

(51) Int. Cl.
| | | |
|---|---|---|
| B29C 65/48 | (2006.01) | |
| B32B 38/10 | (2006.01) | |
| B32B 43/00 | (2006.01) | |
| B32B 15/08 | (2006.01) | |
| B32B 15/09 | (2006.01) | |

(52) U.S. Cl.
CPC ................. B32B 15/08 (2013.01); B32B 15/09 (2013.01); B32B 38/10 (2013.01)
USPC ....................................................... 156/247

(58) Field of Classification Search
USPC ......... 156/230, 233, 234, 238, 240, 241, 247, 156/272.2, 273.5, 275.5, 275.7
See application file for complete search history.

(56) References Cited

U.S. PATENT DOCUMENTS

| | | | |
|---|---|---|---|
| 2,872,391 A | | 2/1959 | Hauser et al. |
| 3,607,474 A * | | 9/1971 | Hensdale ......................... 216/13 |
| 3,637,380 A * | | 1/1972 | Hallman et al. ............... 430/323 |
| 3,661,576 A | | 5/1972 | Crary |
| 5,192,559 A * | | 3/1993 | Hull et al. ........................ 425/89 |
| 6,280,555 B1 * | | 8/2001 | Wilbur ........................... 156/249 |
| 7,521,384 B2 * | | 4/2009 | Kanazawa et al. ............. 438/457 |
| 7,655,342 B2 | | 2/2010 | Hahn et al. |
| 7,858,231 B2 * | | 12/2010 | Nishimura et al. ............ 429/210 |

(Continued)

FOREIGN PATENT DOCUMENTS

| | | |
|---|---|---|
| DE | 2757301 A1 | 7/1979 |
| DE | 19531590 A1 | 3/1997 |

(Continued)

OTHER PUBLICATIONS

English Abstract of JP 62-154793 (May 23, 2014).*

(Continued)

*Primary Examiner* — Sing P Chan
(74) *Attorney, Agent, or Firm* — Pantich Schwarze Belisario & Nadel LLP

(57) ABSTRACT

A method is provided for manufacturing a partially coated carrier structure including a carrier tape coated by a coating. A protective film is applied to at least a portion of the coating, the coating is partially removed from the carrier tape, and the protective film is removed from the coating. A device for manufacturing a partially coated carrier structure by a method of this type includes a first conveying facility for conveying a carrier tape coated by a coating, an application facility for application of a protective film to at least a portion of the coating, and at least one tool that can be used to partially remove the coating from the carrier tape.

14 Claims, 2 Drawing Sheets

(56) References Cited

U.S. PATENT DOCUMENTS

| | | | |
|---|---|---|---|
| 2002/0114948 A1 | 8/2002 | Schumann et al. | |
| 2004/0067347 A1 | 4/2004 | Curcio et al. | |
| 2005/0153107 A1* | 7/2005 | Iijima | 428/195.1 |
| 2011/0100687 A1* | 5/2011 | Hong et al. | 174/257 |

FOREIGN PATENT DOCUMENTS

| | | |
|---|---|---|
| DE | 10045783 A1 | 11/2001 |
| DE | 10224452 C1 | 11/2003 |
| DE | 102004040998 A1 | 2/2006 |
| JP | 62154793 A * | 7/1987 |
| WO | 2006018214 A1 | 2/2006 |

OTHER PUBLICATIONS

EP Search Report issued Jul. 10, 2012 in EP Application No. 12002343.7.

Office Action issued Jan. 30, 2012 in DE Application No. 10 2011 018 342.6.

* cited by examiner

METHOD FOR MANUFACTURING A PARTIALLY COATED CARRIER STRUCTURE

BACKGROUND OF THE INVENTION

The invention relates to a method for manufacturing a partially coated carrier structure, comprising a carrier tape coated by a coating. The invention also relates to a carrier structure manufactured according to the method, and to a device for manufacturing a partially coated carrier structure by the method.

In the course of their manufacture, contactable carrier structures can be designed for specific applications such that they comprise contactable and non-contactable surfaces. For this purpose, a contactable coating, which has previously been applied to a carrier tape, can be partially removed again.

This is disadvantageous in that residues as, for example, chippings may be generated while removing the coating and may deposit on and thus impair the contactable coating. Unless such residues are removed carefully, and thus laboriously, from the coatings, these become scrap during the manufacturing of the carrier structures.

BRIEF SUMMARY OF THE INVENTION

Accordingly, it is an object of the invention to overcome the disadvantages of the prior art. In particular, a method for designing a carrier structure is to be found that is as easy and inexpensive as possible and associated with the production of less scrap. Moreover, the method should also be easy to implement in a rapid mass production scenario. It is also an object of the invention to provide a device that can be used to generate a carrier structure of this type, and to provide a carrier structure manufactured by this device.

The objects of the invention are met according to one embodiment in that a protective film is applied to at least a portion of the coating, followed by partially removing the coating from the carrier tape, and then removing the protective film from the coating.

What this attains is that the contactable coated surfaces cannot be contaminated by residues of the coating when the coating is removed from those places in which a non-contactable area is to be generated. Any arising contamination is deposited on the protective film and is removed along with the protective film when the film is being removed from the carrier structure. The protective film can consist of several separate pieces that are applied to the coating in different places. All areas to be protected from residues of the coating can be covered by protective film for this purpose.

The invention according to another embodiment can provide for applying a protective film to at least a portion of the coating in a first step, at least partially removing the coating from the carrier tape in a second step that follows after the first step, and removing the protective film from the coating in a third step that follows after the second step.

The time sequence of events ensures that the protective film prevents air-borne contamination, which may arise during removal of the coating, from being deposited in areas of the coating whose surfaces need to stay clean, whereas concurrent implementation of the working steps is still associated with some risk of minor contamination.

Particularly advantageous embodiments of the method are characterized in that the coating is removed from the carrier tape by mechanical means, preferably by peeling, particularly preferably by peeling with an edge of at least one peeling tool.

The coating can be removed in one area or in more areas in this context. Mechanical removal is particularly easy to implement, and the protective film-protected areas of the coating are well-protected from contamination arising in this context, whereas chemical removal or removal by laser or particle beams pose particular requirements to be met by the protective film.

The invention according to another embodiment can provide the protective film to be applied by gluing or adhering it to the coating. Especially gluing, but adhering as well, connects the protective film to the coating, such that it remains at those places at which it is being applied and which are to be protected by the protective film during further processing.

Another embodiment of the method according to the invention can provide the protective film and the carrier tape coated by the coating being conveyed parallel to each other at least in part, in particular in the same direction, preferably at the same conveying rate. This measure ensures simple and inexpensive implementation of a mass production procedure. Especially in the processing of continuous tapes of the carrier tape and of the protective film, this is a well-suited measure for designing a simple production facility.

Moreover, the invention according to a further embodiment can provide the protective film to be removed from the coating by pulling it off and/or by chemical means. This measure also serves purposes of mass production of the carrier structures. In the context of gluing-on the protective film, it is particularly preferred to pull the protective film off again. In order to make sure that the protective film can be pulled off without difficulty, an adhesive with suitable low adhesive power can be used. The adhesive residues can be removed by chemical means in a subsequent cleaning step.

According to another embodiment, the invention can provide the carrier tape to be coated by the coating, in particular prior to the first step. Including the coating step leads to further simplification of the manufacturing procedure and completes the procedure.

In this context, the invention according to one embodiment can provide the coating to be processed on the carrier tape by electroplating. Processing by electroplating leads to improved contactability of the coated areas.

The invention according to another embodiment can provide the coating to be applied to the carrier tape by roll cladding. Roll cladding of the coating and the carrier tape provides an efficient and stable coating method, which, in addition, is particularly well-suited for mass production.

Moreover, the invention according to a further embodiment can provide that the carrier tape or the carrier tape coated by the coating and/or the protective film are present as continuous tapes, which are rolled up, at least partially, and are unrolled during the procedure. The continuous tapes are particularly easy to process in an industrial mass production process. Obviously, a continuous tape is not to be understood to be truly tapes of infinite length. The tapes can have a length of, for example, approximately several meters to several kilometers.

The invention according to another embodiment can also provide that the protective film removed from the coating and/or the carrier structure produced by the method is rolled up as a continuous tape, wherein it is preferable to place a second protective film, particularly preferably a protective film made of paper, on the partially coated carrier structure before rolling up the carrier structure and rolling it up together with the carrier structure.

The rolling-up leads to a mass product that processes well, since long tapes can be stored and transported in a space-saving manner. The additional second protective film is to protect the surface of the carrier structure when it contacts the underside of the carrier structure, for example when the carrier structure is being rolled up.

It is particularly preferred for the invention to provide that no protective film is applied to areas in which the coating is to be removed. This measure avoids the protective film being destroyed upon removal of the coating. This not only allows protective film material to be saved, but it also allows a simple procedure to be used for partial removal of the coating.

The invention according to a still further embodiment can provide the coating to fully cover the carrier tape, at least on one side, prior to partially removing the coating. Since the coverage is complete, there is no need to pay attention to omitting an area. This simplifies the coating process significantly. The coating then needs to be removed from all areas of the manufactured carrier structure that are to be non-coated.

Particularly advantageous embodiments of the method are characterized in that a metallic tape is used as the carrier tape, preferably made of a copper alloy, particularly preferably made of $CuSn_6$, and/or a plastic film is used as a protective film, preferably a plastic film coated by adhesive on one side, in particular a PET (polyethylene terephthalate) film, and/or a metallic coating is used as the coating, preferably having a contactable surface, in particular an Al—Si alloy. These materials are particularly well-suited for implementation of the method.

The invention according to one embodiment can also provide the thickness of the carrier tape to be from 0.1 mm to 2 mm, preferably the thickness to be from 0.6 mm to 1 mm. Moreover, the invention according to an embodiment can provide the width of the carrier tape to be from 5 mm to 500 mm, preferably the width to be from 10 mm to 200 mm, particularly preferably the width to be from 20 mm to 120 mm.

According to a further embodiment, the invention can provide the thickness of the coating to be from 10 μm to 100 μm, preferably from 50 μm to 70 μm.

Moreover, the thickness of the protective film can be provided to be from 5 μm to 500 μm, preferably the width to be from 10 μm to 150 μm, particularly preferably the width to be from 50 μm to 100 μm, even more particularly preferably the width to be 80 μm.

At the specified dimensions of carrier tape, coating, and protective film, mass production can be implemented to be particularly easy and inexpensive. Moreover, the manufactured carrier structures are easy to process.

Moreover, the invention according to an embodiment can provide the width of the area in which the coating is not peeled off to be 1 mm to 50 mm, preferably 5 mm to 15 mm.

The objects of the invention are also met by a partially coated carrier structure manufactured by a method of this type.

The objects of the invention are further met by a device for manufacturing a carrier structure that is partially coated by a method of this type, wherein the device comprises a first conveying facility for conveying a carrier tape coated by a coating, and an application facility for application of a protective film to at least a portion of the coating, wherein the device comprises at least one tool that can be used to partially remove the coating from the carrier tape.

The application facility can be a simple roller system used to press the protective film onto the coating of the carrier tape. The protective film and/or the coated carrier tape are stored and processed by machines in the form of rolled-up tapes. In this context, the invention in one embodiment can provide the carrier tape and the protective film, in certain areas, to be conveyable parallel to each other.

The invention is based on the surprising finding that a simple measure, such as the application of a protective film, allows contamination of the surfaces of the coating of a carrier structure arising during manufacture to be reduced or even prevented. As a result, substantially less or no scrap is produced any longer, which saves resources and costs. The chippings generated mainly while peeling areas off the coating do not reach the surface of the remaining coating, but remain on the protective film instead. It can be particularly preferred for this purpose to provide the surface of the protective film such that the expected chippings adhere or stick well to this surface.

After removal of the coating, the soiled protective film can simply be pulled off again, which in turn removes the contamination lying on the surface of the protective film. In order to prevent contamination by particles that may drop off the protective film onto the coating, the invention can also provide that the coating is cleaned in a stream of fluid after removal of the protective film. The stream of fluid can be a liquid solvent that can be used to remove other contaminations as well, or it can be a simple stream of air used to blow the particles away.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
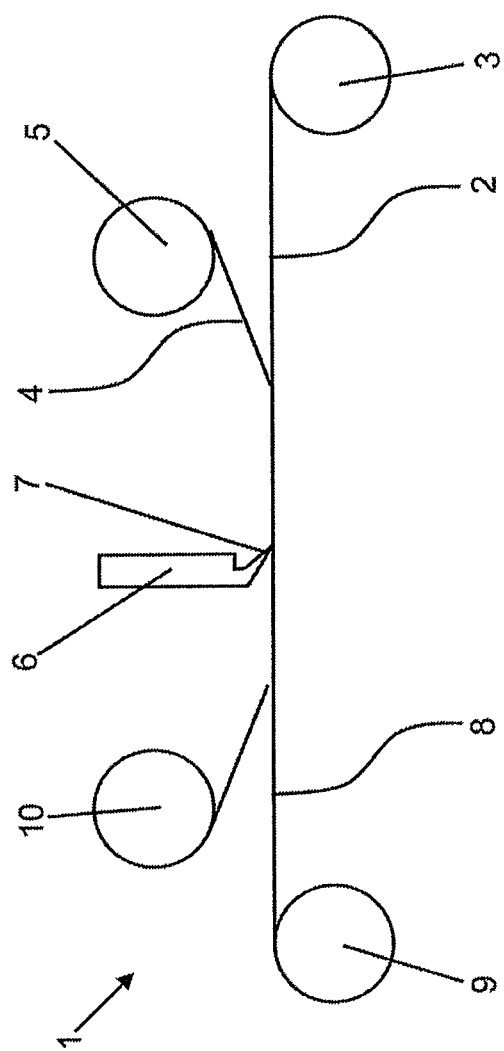
FIG. 1 is a schematic side view of a device according to one embodiment of the invention for performing methods of the invention.

FIG. 1 shows a schematic side view of a device 1 according to an embodiment of the invention for manufacturing a carrier structure. In the device 1 a coated carrier tape 2, being unrolled from a roll 3, is covered by a protective film 4 made of PET. The protective film 4 adheres to the surface of the coated carrier tape 2. The coated carrier tape 2 consists of a copper alloy coated on one side by an aluminum-silicon alloy. The coated side is on top, so that the protective film 4 is being applied to the coated side of the coated carrier tape 2.

The protective film 4 also is rolled up on a roll 5. The tapes of the carrier tape 2 and of the protective film 4 are unrolled from the rolls 3, 5 by device 1 using motors. By deflection of the protective film 4, the protective film 4 and the carrier tape 2 are guided to be parallel for a certain distance. In this area, the protective film 4 adheres to the coated carrier tape 2. The protective film 4 is narrower than the coated carrier tape 2, so that less than the entire width of the coated carrier tape 2 is covered by protective film 4. The protective film 4 and the coated carrier tape 2 are guided at the same speed, from right to left in FIG. 1.

In the area in which the protective film 4 is applied to a portion of the carrier tape 2, a peeling tool 6 having an edge or blade 7 engages the part of the coated carrier tape 2 that is not covered by the protective film 4. The peeling tool 6 peels off the part of the coating of carrier tape 2 that is not covered by the protective film 4. The chippings generated in the process do not come to lie on the coating of the carrier tape 2, since the coating is covered by the protective film 4.

Subsequently, the protective film 4 and chippings lying on it are pulled off. The finished carrier structure 8 is then rolled onto a roll 9, whereas the chippings-contaminated protective film 4 is rolled onto a further roll 10. A further protective film made of paper (not shown) can be arranged on the underside of the carrier tape 2 and prevents the backside of the carrier structure 8 from adversely affecting, for example scratching, the front side of the partially coated carrier structure 8, while rolling up the carrier structure 8.

Figure 3:
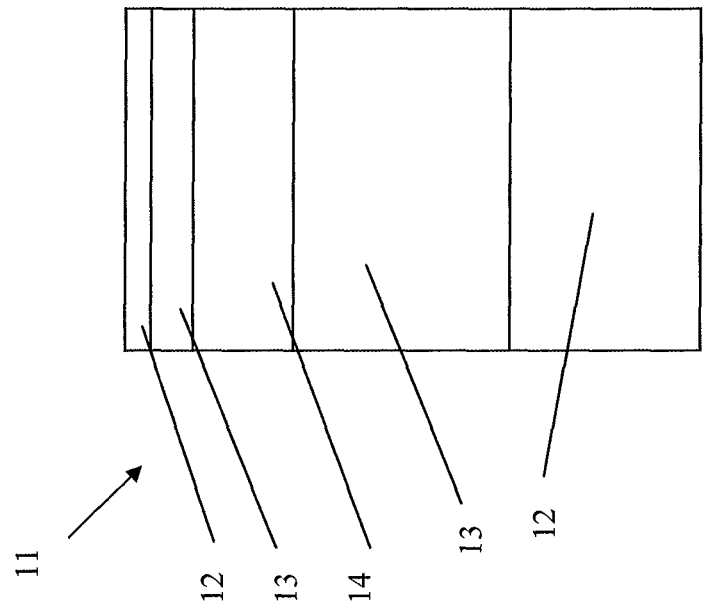
FIG. 3 is a schematic plan view of a coated carrier tape having a protective film according to the embodiment of FIG. 2.
Figure 2:
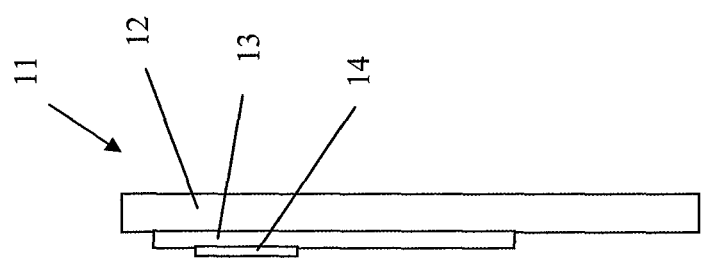
FIG. 2 is a schematic lateral view of a coated carrier tape onto which a protective film has been applied according to an embodiment of the invention.

FIG. 2 shows a schematic lateral view of an intermediate product 11 of the carrier structure to be generated, here a coated carrier tape 12 having a protective film 14, which is shown in a schematic plan view in FIG. 3. A coating 13, which was applied for example by roll cladding, is arranged on the carrier tape 12. The protective film 14 is arranged on part of the coating 13.

The intermediate product 11 shown can be present either before or after partial removal of the coating 13.

In the former case (the intermediate product 11 is shown prior to partial removal of the coating 13), less than the entire surface of the carrier tape 12 was coated with coating 13. Some parts are exposed. The protective film 14 has been glued over part of the coating 13. A peeling tool (not shown) or any other device that is well-suited for removal of the coating 13 removes all non-covered areas of the coating 13 or parts thereof in a subsequent step. Subsequently, the protective film 14 and chippings and residues of the coating 13 lying on it are pulled off. What remains is the carrier structure to be generated without the chippings generating scrap material. In this context, it is sufficient to glue the protective film 14 only to those parts of the coating 13 which would be adversely affected by contamination, i.e., it is not mandatory to glue the protective film 14 to the entire coating 13.

In the second case (the intermediate product 11 is shown after partial removal of the coating 13), the protective film 14 was glued only to an area of the coating 13 that was in particular need of protection. The coating 13 extended over the entire surface of the carrier tape 12 before the coating 13 was partially removed. In the subsequent step, the protective film 14 and all dirt particles adhering to it are pulled off, and the final carrier structure consisting of carrier tape 12 and coating 13 is finished.

In both cases, the coating 13 can be protected, at least partially, from the adverse influences of residues that arise while removing the coating 13.

An adhesive tape that can be obtained inexpensively, such as a TESA® film, can be used as protective film 4, 14.

The features of the invention disclosed in the preceding description and in the claims, figures, and exemplary embodiments, can be essential for the implementation of the various embodiments of the invention both alone and in any combination.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for manufacturing a partially coated carrier structure comprising a carrier tape coated by a coating, the method comprising steps of:
   applying a protective film to at least a portion of the coating in a first step;
   partially mechanically removing the coating from the carrier tape with an edge of at least one peeling tool in a second step following the first step; and
   removing the protective film from the coating remaining on the carrier tape in a third step following the second step,
   wherein the protective film and the carrier tape coated by the coating are conveyed parallel to each other in certain areas in a same direction at a same conveying rate.

2. The method according to claim 1, wherein the protective film is applied to the coating by gluing or adhesion.

3. The method according to claim 1, wherein the protective film is removed from the coating by pulling off.

4. The method according to claim 1, wherein the protective film is chemically removed from the coating.

5. The method according to claim 1, wherein the coating is applied to the carrier tape by one of electroplating and roll cladding.

6. The method according to claim 1, wherein at least one of the carrier tape, the carrier tape coated by the coating and the protective film is present as a continuous tape at least partially rolled up, and wherein the continuous tape is unrolled during the method.

7. The method according to claim 1, wherein at least one of the protective film removed from the coating and the carrier structure manufactured by the method is rolled up as a continuous tape.

8. The method according to claim 7, wherein a second protective film, optionally made of paper, is placed on the carrier structure before rolling up the carrier structure, and wherein the second protective film is rolled up together with the carrier structure.

9. The method according to claim 1, wherein no protective film is applied to areas in which the coating is to be removed.

10. The method according to claim 1, wherein the coating fully covers the carrier tape at least on one side of the carrier tape prior to at least partially removing the coating.

11. The method according to claim 1, wherein the carrier tape comprises a metallic tape, the protective film comprises a plastic film, and the coating comprises a metallic coating.

12. The method according to claim 11, wherein the metallic tape comprises a copper alloy, the plastic film is coated by adhesive on one side, and the metallic coating has a contactable surface.

13. The method according to claim 12, wherein the copper alloy is $CuSn_6$, the plastic film is a polyethylene terephthalate film, and the metallic coating is an Al—Si alloy.

14. The method according to claim 1, wherein the second step further comprises generating at least one chip or residue from the coating, and wherein the third step further comprises removing the at least one chip or residue with the protective film.

* * * * *